(12) United States Patent
Thomas

(10) Patent No.: US 8,576,658 B2
(45) Date of Patent: Nov. 5, 2013

(54) METHOD FOR SEISMIC ACQUISITION ON THE SEABED, GUIDING EQUIPMENT, SEISMIC ACQUISITION EQUIPMENT AND SEISMIC ACQUISITION SYSTEM FOR THE IMPLEMENTATION OF THIS METHOD

(75) Inventor: Hubert Thomas, Meyreuil (FR)

(73) Assignee: CGGVeritas Services SA, Massy Cedex (FR)

( * ) Notice: Subject to any disclaimer, the term of this patent is extended or adjusted under 35 U.S.C. 154(b) by 135 days.

(21) Appl. No.: 13/108,285

(22) Filed: May 16, 2011

(65) Prior Publication Data
US 2011/0280100 A1 Nov. 17, 2011

Related U.S. Application Data

(63) Continuation of application No. 11/400,134, filed on Apr. 7, 2006, now Pat. No. 7,965,583.

(51) Int. Cl.
*G01V 1/38* (2006.01)
(52) U.S. Cl.
CPC ............. *G01V 1/38* (2013.01); *G01V 1/3817* (2013.01); *G01V 1/3852* (2013.01)
USPC .............................................. 367/15; 367/16
(58) Field of Classification Search
USPC ....................................... 367/16, 19
See application file for complete search history.

(56) References Cited

U.S. PATENT DOCUMENTS

| | | | |
|---|---|---|---|
| 4,555,779 A | 11/1985 | Roberts | |
| 4,635,236 A | 1/1987 | Roberts | |
| 5,214,617 A * | 5/1993 | Rouquette | 367/124 |
| 5,253,223 A | 10/1993 | Svenning et al. | |
| 5,894,450 A * | 4/1999 | Schmidt et al. | 367/134 |
| 6,005,828 A | 12/1999 | Carroll et al. | |
| 6,625,083 B2 | 9/2003 | Vandenbroucke | |
| 6,891,733 B2 | 5/2005 | Strang | |
| 6,932,185 B2 | 8/2005 | Bary et al. | |
| 7,016,260 B2 * | 3/2006 | Bary | 367/15 |
| 7,050,355 B2 | 5/2006 | Robertsson et al. | |
| 7,224,641 B2 | 5/2007 | Nas | |
| 7,310,287 B2 | 12/2007 | Ray et al. | |
| 2003/0117893 A1 | 6/2003 | Bary | |

FOREIGN PATENT DOCUMENTS

| | | |
|---|---|---|
| EP | 1217390 A1 | 6/2002 |
| WO | 02/37140 A2 | 5/2002 |

OTHER PUBLICATIONS

Scheidhauer, et al., "Development of a system for 3D high-resolution seismic reflection profiling on lakes," Marine Geophysical Researches (2005) 26: 183-195.

* cited by examiner

*Primary Examiner* — Krystine Breier
(74) *Attorney, Agent, or Firm* — Patent Portfolio Builders, PLLC

(57) ABSTRACT

The invention relates to a method for acquiring seismic data at a plurality of positions spread out over a zone on the seabed which includes transmitting acoustic waves in the water layer above the zone by a plurality of sources, for each of the acquisition positions, dropping from the surface a seismic acquisition equipment, the equipment comprising a seismic acquisition unit and autonomous guiding equipment adapted to receive while descending acoustic signals from the sources and to control its trajectory according to the received acoustic signals so as to direct said equipment towards said position, performing the seismic acquisition, causing the acquisition equipments to move up to the surface, and retrieving the acquisition equipments on the surface.

20 Claims, 6 Drawing Sheets

METHOD FOR SEISMIC ACQUISITION ON THE SEABED, GUIDING EQUIPMENT, SEISMIC ACQUISITION EQUIPMENT AND SEISMIC ACQUISITION SYSTEM FOR THE IMPLEMENTATION OF THIS METHOD

This application is a Continuation of application Ser. No. 11/400,134, filed on Apr. 7, 2006 now U.S. Pat. No. 7,965,583, which claims priority to Application No. 0503475 filed in France on Apr. 7, 2005, the entire contents of which are hereby incorporated by reference into the present application and for which priority is claimed under 35 U.S.C. 120.

The invention relates to the acquisition of seismic data on the seabed, and more precisely the deployment and retrieval of equipments incorporating seismic sensors to be placed on the seabed according to a precise geometry.

Different techniques have been proposed for the placement on the seabed of autonomous equipments incorporating seismic sensors according to a pre-et geometry, such as a regular mesh.

A first method consists in successively dropping such equipments from the rear deck of a boat, using the position of the boat at the time of dropping as the basis. This method is highly inaccurate and can only be envisaged for shallow waters. It does not allow said equipment to be guided towards a point of given co-ordinates on the seabed.

A second method consists in using a boat equipped with a crane and acoustic positioning equipment known as "Short Base". The equipment to be placed on the seabed is attached to the cable on the crane, and an acoustic beacon compatible with the "Short Base" is attached onto the hook. The equipment is initially located, thanks to the "Short Base", within a co-ordinate system based on the axes of the boat. The transition from the local co-ordinate system of the boat to the absolute geographic co-ordinate system, needed to guide the package towards its target point, is carried out through knowledge of the heading, rolling, pitching and the latitude and longitude of the boat provided by an attitude sensing system and a radio locating device. This method only applies to shallow waters and takes considerable time considering the seabed-to-surface tos and fros that the hook on the crane has to perform for each additional piece of equipment. Moreover, the location accuracy of the "Short Base" system, which quickly deteriorates with depth, is no longer compatible with the objectives required by the measurement equipment.

Another proposal is disclosed in European patent application EP 1.217.390 and French patent application FR 2.833.359. This proposal involves, deploying the acquisition equipments by means of gravity and ex post determining their position through the use of "Short Base" location equipment on the boat or by deploying GPS acoustic relay-buoys. Such relay buoys are disclosed for example in French patent application FR 2.643.463. This method does not allow the acquisition unit to be guided with the required precision to a point of pre-determined geographic co-ordinates. U.S. Pat. No. 6,657,921 discloses an alternative in which each equipment has associated therewith a hydrodynamically profiled body and a means for controlling the attitude of the acquisition equipment once it has engaged the seabed. In this case, the deployment takes place with the equipments connected to each other by a cable at the end of which an anchor is attached. The positioning in the transversal direction to the placement direction is obtained by the transversal displacement of the boat in order to counterbalance any possible current.

Another alternative is disclosed in U.S. Pat. No. 5,579,285. It hardly enables several submarine vessels to be simultaneously guided. The presence of drift buoys is not compatible with long term operations. Indeed, the sea currents distance the buoys far too quickly from the work zone.

A third method consists in positioning the units using a ROV type wire-guided vessel. The positioning of the ROV is performed either by a "Long Base" deployed on the seabed or by a "Short Base" installed on the support vessel. The umbilical which links the ROV to the surface restricts its horizontal displacements. Due to this, operations are lengthy and expensive.

The purpose of the invention is a method for positioning acquisition seismic equipments on the seabed according to a pre-set geometry and for retrieving them. Such a method should be quick and inexpensive as well as suitable for the placement of numerous units.

There is provided according to the invention a method for acquiring seismic data at a plurality of positions spread out over a zone on the seabed, comprising the following steps:
transmitting acoustic waves in the water layer above said zone by means of a plurality of sources,
for each of said acquisition positions, dropping from the surface a seismic acquisition equipment, said equipment comprising a seismic acquisition unit and autonomous guiding equipment adapted to receive acoustic signals from said sources and to control the trajectory of the seismic acquisition equipment according to the received signals so as to direct said it towards said position,
performing the seismic acquisition,
causing the acquisition equipments to move back to the surface,
retrieving the acquisition equipments on the surface.

The invention will be better understood and other features will become clear from the description that follows, made in reference to the annexed drawings.

Figure 1:
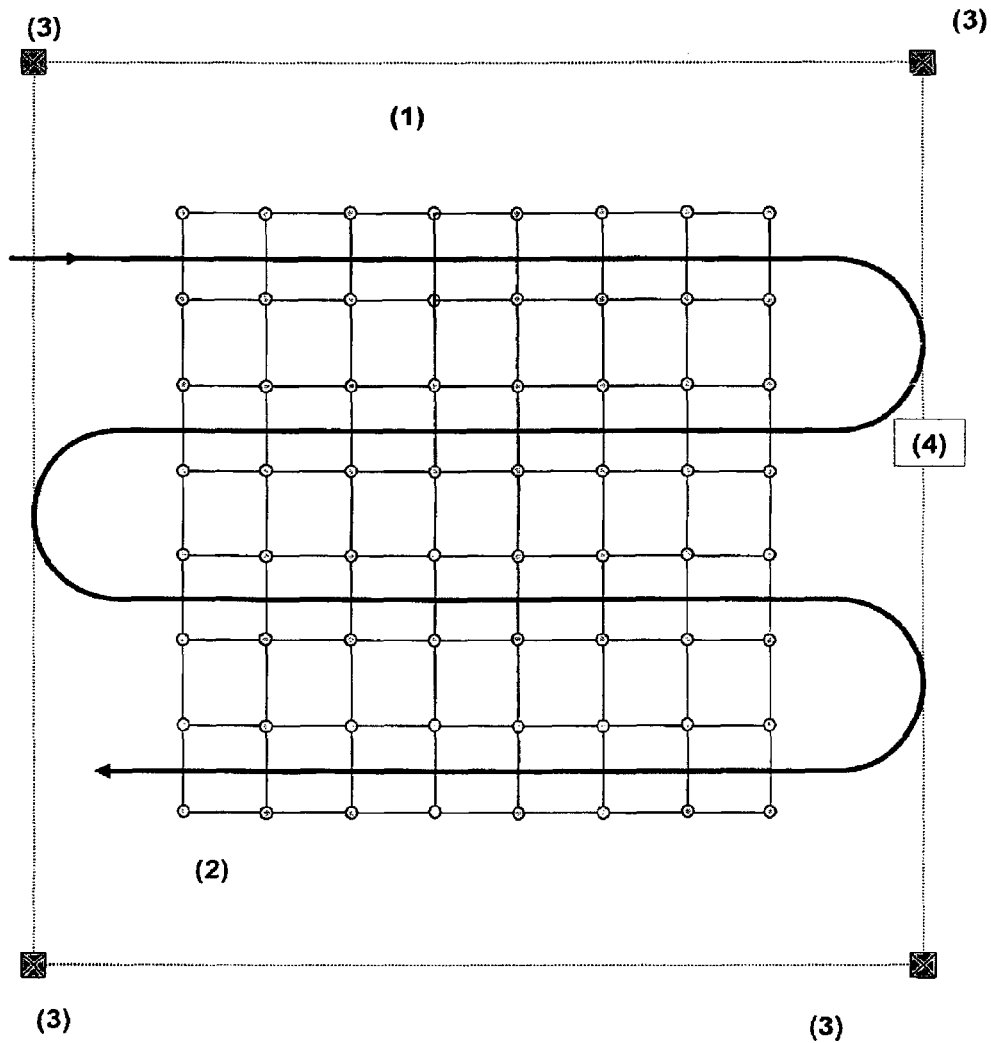
FIG. 1 represents an overall view of the equipments to be placed on the seabed for seismic exploration of an underground zone.

In the shown embodiment, a device for the deployment and retrieval of autonomous underwater seismic acquisition equipment is constituted of a support vessel 5 from which acoustic transmitting beacons 3 and the seismic acquisition equipments 7 are deployed. The vessel 5 has an operations control and monitoring station. The vessel 5 can if needed be complemented with a free underwater vehicle 29 (FIG. 2) capable of precisely determining the respective positions of the equipments on the seabed, and communicating with them for time resetting and/or the transfer of data. The device can also be complemented with GPS acoustic relay buoys 11 (FIG. 3) which include means for communicating with both equipment on the seabed (such as acoustic beacons 3) and with equipment on the surface (vessel 5 or buoys or acquisition equipment once resurfaced). These GPS buoys are notably useful for locating the resurfaced equipment and thereby speeding up their retrieval.

According to an embodiment, the vessel 5 is equipped with radio navigation equipment 6, such as a GPS receiver operating on differential mode, and a cartographic means for following up and checking its trajectory according to pre-set routes 4, such as a portable calculator with a colour display screen. Note that the vessel 5 can be a small vessel that does not need to have the dynamic positioning function "DP", as it is commonly known.

Figure 4:
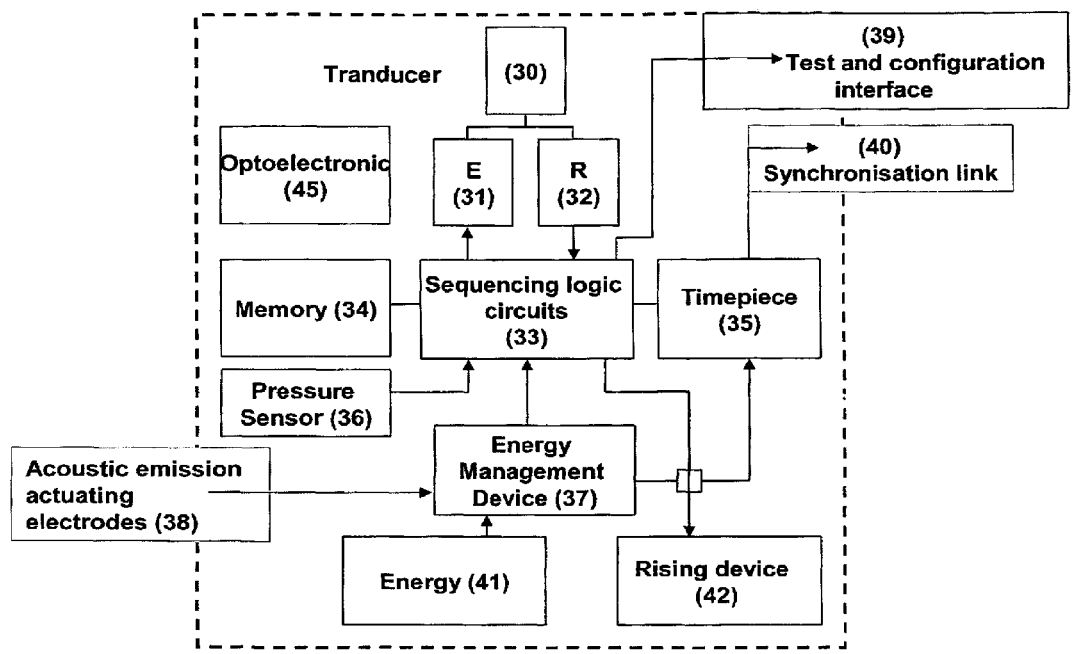
FIG. 4 is a synoptic view of an acoustic transmitting beacon.

The acoustic transmitting beacons 3 are constituted of a piezoelectric transducer 30 actuated by power electronics 31, which is controlled by sequencing logic circuits 33 according to sequences previously stored in a memory 34 through the use of a test and configuration interface 39. A Quartz type precise timepiece 35, thermostated or controlled by a MCXO type microcomputer, is used to transmit the ultrasonic series of pulses at perfectly known instances in an absolute temporal reference system. A synchronisation link 40 sets the timepiece on the surface, prior to immersion, to said absolute temporal reference system, which can, by way of example, be the temporal reference system used by the GPS satellites. A pressure sensor 36 allows, by means of acoustic telemetry using the transducer 30, to communicate to the vessel the immersion depth of the beacon during its descent or ascent, and once stabilised on the seabed. A remote control acoustic receiving channel 32 can be used for this purpose or to actuate a means 42 allowing the beacon to be freed from its ballast to cause it to move up to the surface. An electric energy source 41 powers, via an energy management device 37, the different subsets of the underwater acoustic beacon. Note in FIG. 4 the electrodes 38 which allow the acoustic emissions to be triggered only when the beacon is immersed. In order to accurately determine the position each beacon reaches on the seabed, we can perform a calibration by receiving acoustic signals onto a hydrophone positioned vertically under the vessel 5, the latter being located by GPS and substantially describing a circle around the position of immersion. One or two GPS buoys 11 having an acoustic receiver and positioned at stations can also be used. Alternatively, an autonomous underwater vehicle 29 can be used, which vehicle is in acoustic communication with the vessel 5 or with GPS buoys, in order to determine its own position.

Figure 5:
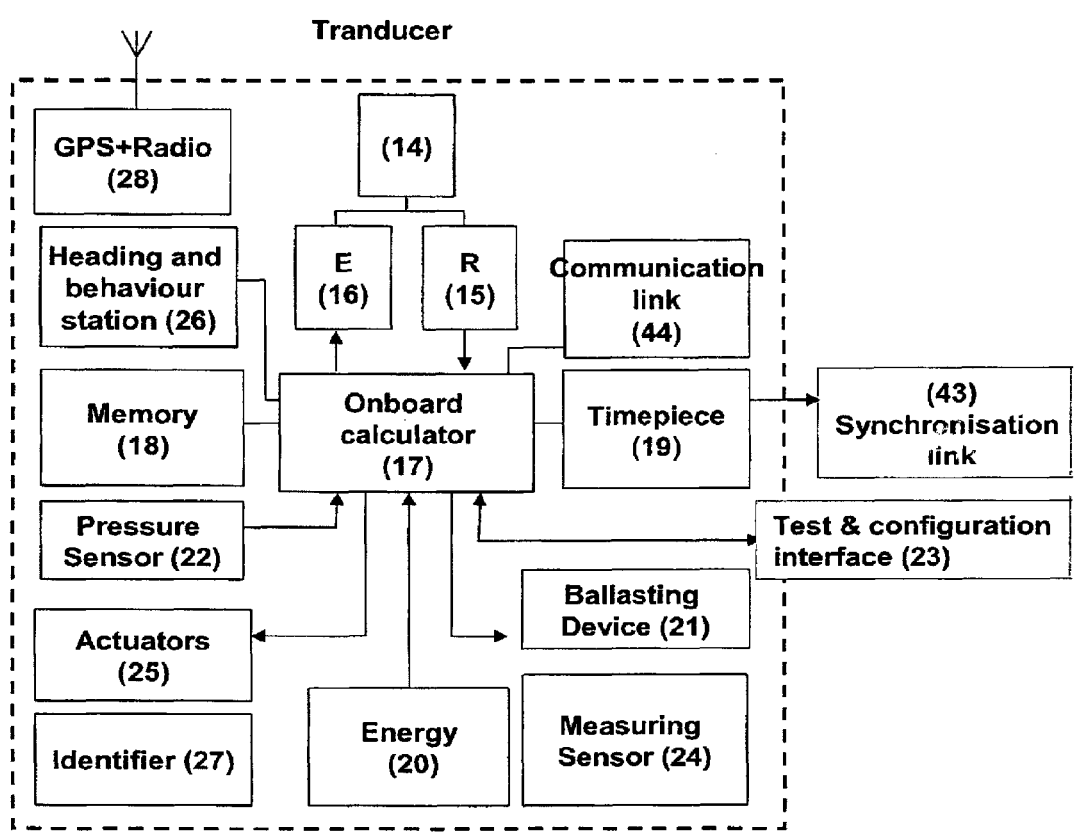
FIG. 5 is a synoptic view of a seismic acquisition equipment.

According to the embodiment shown by the synoptic in FIG. 5, an underwater seismic acquisition equipment comprises: a transducer 14 linked to an acoustic receiver 15, intended to receive and detect acoustic signals from the underwater beacons, a reference timepiece 19, previously synchronised prior to immersion by the interface 43, being used to very accurately date the arrival times of said acoustic signals in an absolute temporal reference system, an onboard calculator 17 allowing the equipments to be guided according to the method described hereafter, an electric energy source 20 which powers the different subsets of underwater equipment. FIG. 5 also represents a seismic sensor 24 and a means 27 for identifying equipment such as a barcode or electronic label with touch free reading.

The transducer 14, via the acoustic receiver 15, can also be used to receive remote control commands or transmit telemetry via a transmit circuit 16. In particular, this device receives the command to modify the Archimede's thrust so as to ensure the ascent to the surface.

The acoustic emission circuit is also used to send to the support vessel the co-ordinates of the equipment once stabilised on the seabed. A wireless communication interface 44 can be designed to allow the equipment to transfer data to a free underwater vehicle which would, for example, collect the recorded contents generated by its measuring sensor 24.

In order to allow the equipment to be guided toward its target position, we download into the memory 18 of the calculator 17, prior to immersion, via the test and configuration interface 23, the three-dimensional co-ordinates of the transmitting beacons and their individual frequency, modulation and recurrence characteristics as well as the geographical co-ordinates of the target point 9. Knowing the arrival times of the acoustic signals issuing from the beacons, the calculator determines the propagation delays and, knowing the average velocity it determines the slant range. These slant ranges are then transformed into a horizontal plane, knowing the immersion of the equipment as measured by the pressure sensor 22. The geographic co-ordinates of the equipment are then calculated in the horizontal plane, for example by applying the least squares method. Theoretically, signals issuing from only two different sources are needed to calculate a position, but it is known that in practice it is preferable, in order to limit the error margin, to use signals from three sources (or more). Once the instantaneous co-ordinates are known, the calculator evaluates the deviation from the optimal trajectory 8. A Kalman filter implanted in the calculator then generates the instructions to be applied to the actuators 25 in order to correct the trajectory knowing the heading and attitude of the equipment as provided by the heading and attitude station 26, in particular to counter any possible sea current 10.

Figure 6:
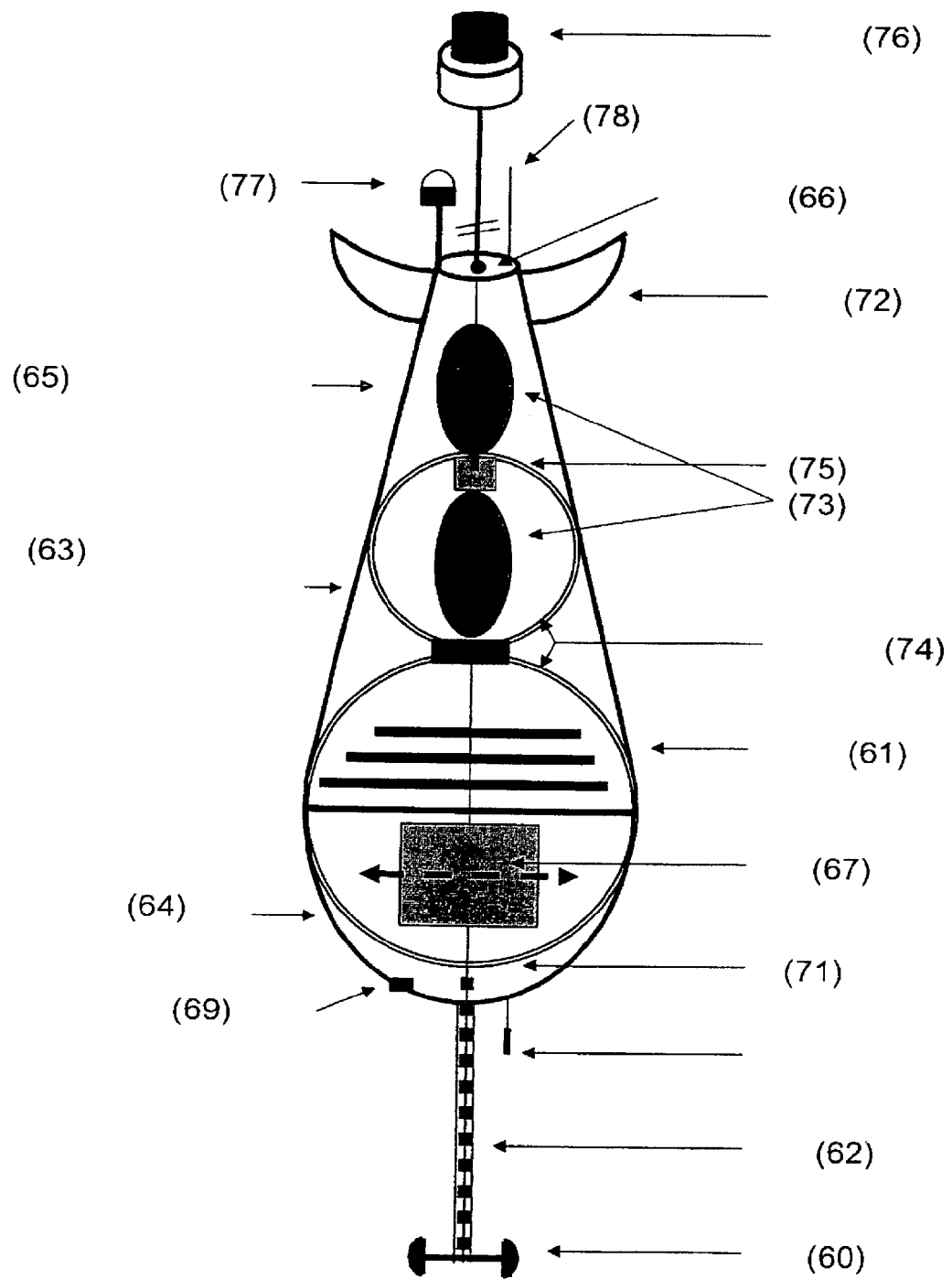
FIG. 6 is a synoptic view of an acquisition equipment including autonomous guiding equipment.

FIG. 6 diagrammatically shows an example of the layout of the seismic acquisition equipment. The equipment comprises a seismic acquisition unit comprising in the shown example a seismic sensor 60 adapted for coupling to the seabed, a recording unit 61 and a connection arm 62 linking the sensor 60 to the recording unit 61. The seismic acquisition unit can be as disclosed in patent application WO 2004/065988.

The guiding equipment comprises a body 63 of hydrodynamic profile. This body is hollow and, as it is common, has three holes (not shown) which allow the equipment to fill with water when dropped and descend. As shown, the body has a lower part 64 of substantially hemispherical shape. Connected to this part 64 is a conical-shaped part 65 which tapers off at its upper end 66. The recording unit 61 is housed in the hemispherical part 64 as well as a battery 67. In an appropriate manner, as shown in FIG. 6, the recording unit 61 is housed inside a pressure-resistant, watertight structure 74 such as a sphere of hyperbaric glass which is itself housed inside the hemispherical part 64. This type of component is supplied for example by the Benthos Inc company. The gap 71 between the structure 74 and the wall of the hemispherical part fills with water when the equipment is dropped, as previously seen, this water being used as ballast.

Rudders 72 are provided in the vicinity of the upper end 66 of the body. In the example shown in FIG. 6, the rudders are fixed. The guiding towards the target position is obtained by transversally displacing the battery 67 inside the structure 74, which displaces the centre of gravity of the equipment and modifies its trajectory in accordance with what was required. This is carried out by means of a standard type of actuator (not shown).

Another possibility consists in installing movable rudders and actuators acting on the rudders to guide the equipment towards the target position.

In the example shown in FIG. 6, also referred to by numeral 21 in FIG. 5, there is also provided a ballasting device 73 housed in a pressure-resistant, watertight structure 74 such as a sphere of hyperbaric glass. This device can contain a volume of oil that can be displaced, by means of a hyperbaric micropump 75 with an integrated, micromotor, towards an inflatable structure located on the outside of the sphere 74. This drives an equivalent volume of water to the outside of the body 63 and lowers the density of the unit allowing it to slow down its descent or activate the ascent to the surface. The micromotor is controlled in reply to the detection of the nearness of the seabed through the use of an echo sounder 69 or via the reception of an acoustic message issuing from the support vessel 5.

FIG. 6 is a diagram showing an acoustic transducer 76 corresponding to the transducer 14 in FIG. 5 as well as a GPS sensor 77 and a radio transmitter 78 corresponding to the components 28 in FIG. 5.

Figure 2:
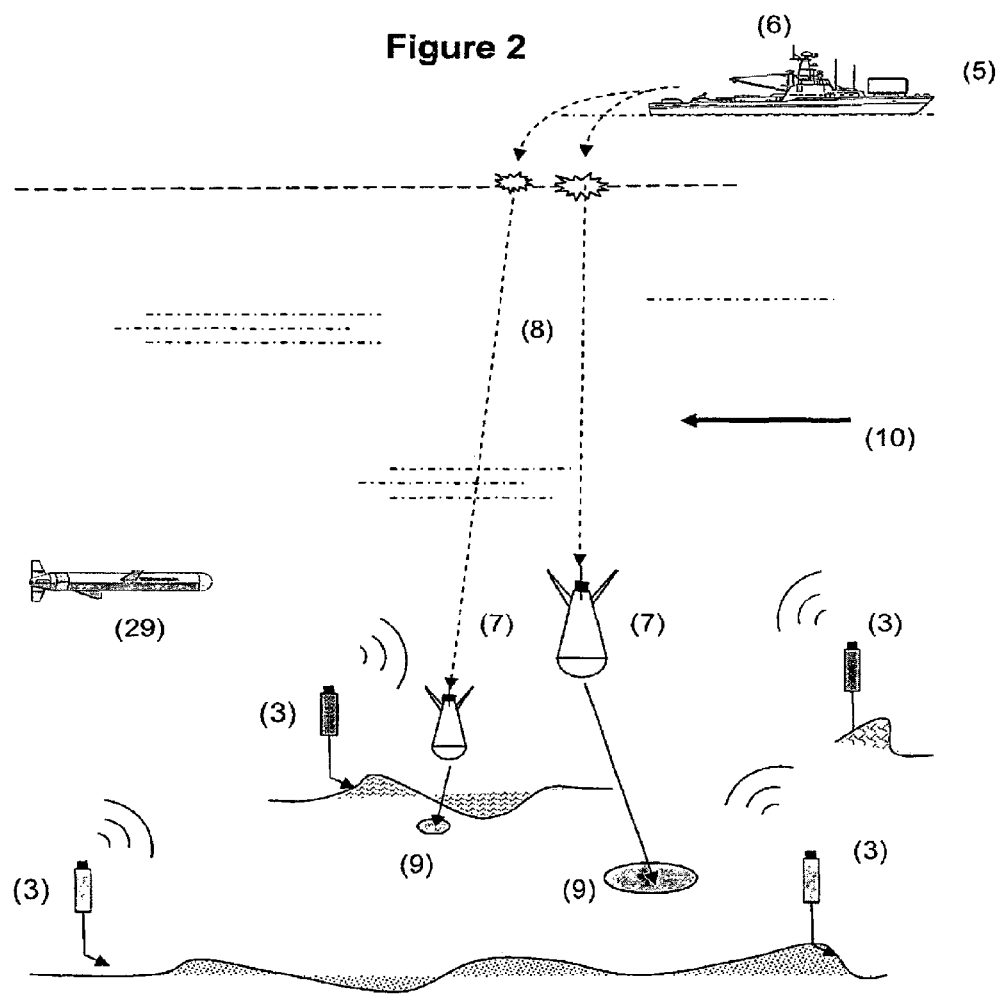
FIG. 2 shows the simultaneous deployment of two seismic acquisition equipments.
Figure 3:
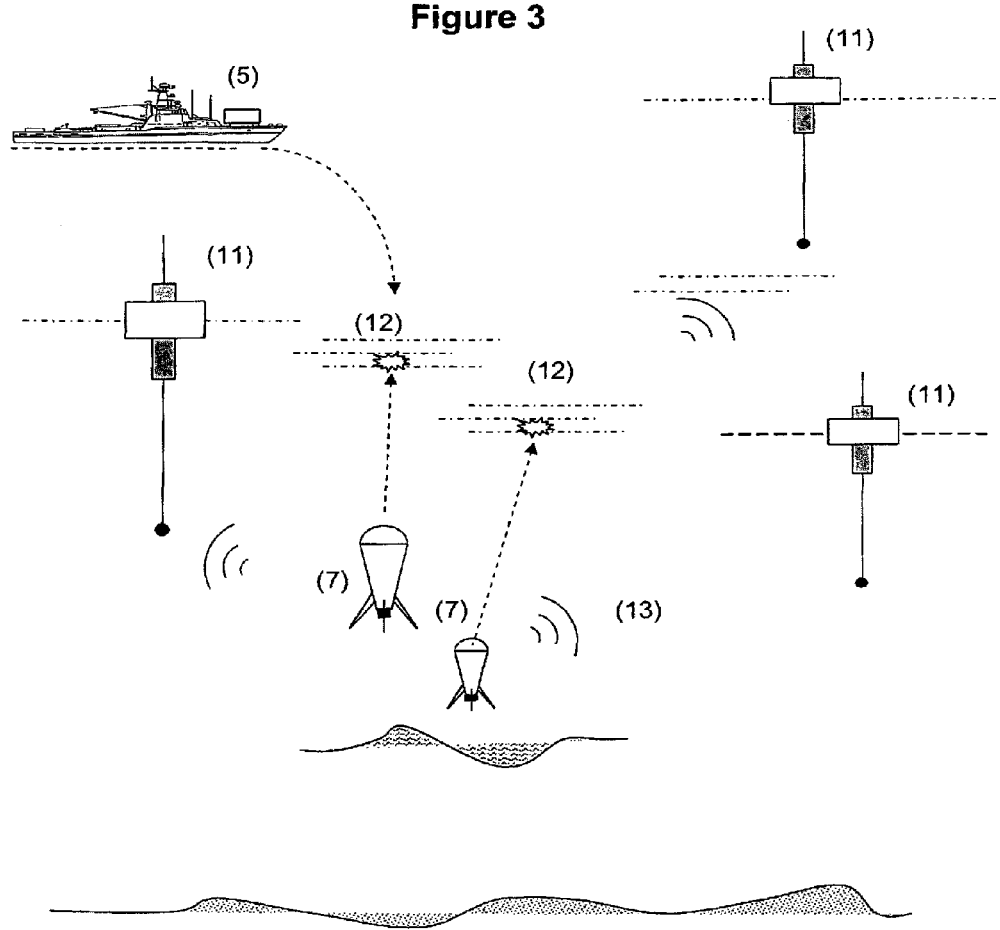
FIG. 3 shows the equipments as they move up for retrieval purposes.

The placement of the seismic acquisition equipment such as described can be done in the following manner. Reference is hereafter made to FIGS. 1 and 2.

FIG. 1 shows the equipments to be placed on the seabed for seismic exploration of an underground zone 1. On one hand, there is provided a network of acquisition equipments 7 which covers the zone to be explored in an appropriate manner for obtaining a seismic image. FIG. 1 shows a meshed network 2 of 8×8=64 acquisition equipments but it will be clear that, in a typical commercial application, the network comprises several hundred seismic acquisition equipments. On the other hand, there is provided a series of acoustic beacons 3 used in the guiding of the acquisition equipments towards their target positions whilst they are descending. FIG. 1 shows four buoys placed at the vertices of a square encircling the network of equipments 7, but this is only an example given by way of illustration.

Knowing the geometry of the acquisition network 7, the number and the respective desired positions ("target positions") of the acoustic beacons 3 are determined.

After having synchronised their timepieces 35 on the surface with the GPS time via the synchronisation link 40, the beacons 3 are deployed by dropping them off the vessel 5 in the vicinity of a point located vertically of the target position. The acoustic beacons are then "calibrated", that is, their respective geographic positions on the seabed are accurately determined. This operation is generally carried out by means of "GIB" type buoys having means for receiving acoustic signals issuing from beacons located on the seabed, a GPS sensor and a radio transmitter/receiver transmitting their position and the time of detection of said acoustic signals to the control station onboard the vessel 5 so that they can be processed.

The beacons 3 normally permanently transmit acoustic sequences comprising an identification code. The transmission can be triggered or stopped via an acoustic instruction transmitted from the vessel 5. The beacons can thus be kept inactive, so as to limit their energy consumption, until the dropping of acquisition equipments begins.

Each acquisition equipment 7 is then supplied information which will allow it to reach the target position assigned to it. For this, the aforementioned information relating to the transmitting beacons and the target position 9 for the acquisition equipment 7 is downloaded onto the calculator of the corresponding guiding equipment 17 onboard the vessel 5.

Insofar as the dropping is concerned, the optimal path to be followed by the vessel 5 guided by a radionavigation system 6 to minimise the overall duration of the operations is determined. FIG. 1 shows a twisted path where each twist passes half way between two, adjacent rows of equipments 7. This enables two equipments 7 to be dropped at the Same time from a single point, which implies a substantial time saving.

For each equipment 7, the descent takes place towards the respective target position thanks to the autonomous action of the guiding equipment, in the manner explained above. The guiding takes place without any intervention or control from the vessel 5. Any given number of equipments can therefore descend simultaneously. Consequently, there are no minimal time intervals that need to be respected between two dropping actions, these can follow on as quickly as the speed of the vessel 5 allows. A large number of acquisition equipments, for example several hundred, can thus be deployed in a very short span of time.

Furthermore, it can be noted that the use of fixed acoustic beacons on the seabed ensures that the quality of acoustic reception improves as the equipment 7 nears the seabed. Indeed, as it comes closer to the seabed, the distances to the acoustic beacons 3 diminish and on the other hand the environment is ever less noisy.

Operations to verify and determine the actual positions reached by the acquisition equipments 7 and operations to reset the timepieces embedded in this equipment can then be carried out by means of an underwater autonomous vehicle 29, as described above. For this operation, that requires no maneuvering, a ROV type heavy duty vehicle is not necessary, a light vehicle is sufficient. This vehicle can be operated independently from the dropping of equipments 7 from the vessel 5. These operations can therefore start before dropping is finished.

Once all the equipments 7 have been placed, the beacons 3 receive an instruction by acoustic communication which triggers their ballasting, and they are retrieved in an appropriate manner on the surface by means of the vessel 5 through the use of "GIB" type GPS buoys, which allow them to be located more quickly and speed up their retrieval. For this purpose, the GPS buoys have radiocommunication with the vessel 5 and/or with a vessel or dinghy launched to carry out the retrieval.

The acquisition of seismic data is then carried out. Shots are fired traditionally from air guns towed by a vessel. The data provided by the sensors of the acquisition equipments is recorded in the recorders 31 of said equipments 7.

After the acquisition, the retrieval of equipments 7 is carried out. For that purpose, the equipments 7 are caused to move up to the surface, by actuating the ballasting device 73, as described above, by means of an acoustic instruction transmitted from the vessel. Once they have surfaced, the equipments 7 are located and retrieved. These operations resort in appropriate manner to GIB type GPS buoys which make use of the acoustic signals 13 transmitted by equipments 7 when they surface, as for the retrieval of the beacons 3. Appropriately, several neighbouring equipments 7 can be caused to move up to the surface simultaneously, so that several equipments 7 can be retrieved in a single operation within a given zone. Alternatively, each equipment 7 can be fitted with a GPS receiver 77 and a radio transmitter 78 so that it can transmit, once it has resurfaced, its geographical co-ordinates 12 to the retrieval vessel.

The invention claimed is:

1. A method for acquiring seismic data at a plurality of acquisition positions spread out over a zone on the seabed, the method comprising the following steps:

transmitting acoustic waves in the water layer above said zone by using a plurality of sources;

for said acquisition positions, dropping from the surface seismic acquisition equipment, a seismic acquisition equipment comprising a seismic acquisition unit and an autonomous guiding equipment adapted to receive acoustic signals from said sources and to control a trajectory of the seismic acquisition equipment according to the received signals so as to direct said seismic acquisition equipment towards said acquisiton position on the seabed, wherein said control of the trajectory is performed in the seismic acquisition equipment with no input from a mother vessel;

performing the seismic acquisition with a seismic sensor located on the seismic acquisition equipment such that the seismic sensor couples to the seabed; and causing the seismic acquisition equipment to move back to the surface together with the seismic sensor.

2. The method of claim 1, further comprising:
programming the plurality of sources to emit the acoustic waves independently of the mother vessel when deployed in the water layer.

3. The method of claim 1, wherein the seismic acquisition equipment arrives at the acquisition position on the seabed without any propulsion equipment.

4. The method of claim 1, wherein the plurality of sources have corresponding individual frequencies, modulation, and recurrence characteristics.

5. The method of claim 1, further comprising:
instructing the plurality of sources to land on the seabed.

6. The method of claim 1, further comprising:
receiving immersion depths of the plurality of the sources at the mother vessel.

7. The method of claim 1, further comprising:
instructing the plurality of sources to free themselves from their ballast and resurface.

8. The method of claim 1, further comprising:
storing in a memory of the autonomous guiding equipment three-dimensional coordinates of the plurality of sources.

9. The method of claim 8, further comprising:
further storing in the memory individual frequencies, modulation, and recurrence characteristics of the plurality of sources.

10. The method of claim 9, further comprising:
storing in the memory geographical coordinates of the acquisition positions.

11. The method of claim 10, further comprising:
determining propagation delays based on known arrival times of the acoustic signals from the plurality of sources to the autonomous guiding equipment; and
determining a slant range based on known average velocity of the seismic acquisition equipment.

12. The method of claim 11, further comprising:
transforming the slant range into a horizontal plane based on an immersion depth of the seismic acquisition equipment; and
calculating instantaneous geographical coordinates of the seismic acquisition equipment in the horizontal plane.

13. The method of claim 12, further comprising:
evaluating, based on the instantaneous geographical coordinates, a deviation of the seismic acquisition equipment from an optimal trajectory.

14. The method of claim 13, further comprising:
controlling actuators of the seismic acquisition equipment to modify its trajectory based on the determined deviation.

15. A seismic acquisition unit for acquiring seismic data at a seabed, the seismic acquisition unit comprising:
a seismic acquisition device configured to record and store seismic waves,
wherein the seismic acquisition device includes a seismic sensor that couples to the seabed and records the seismic waves;
a guiding equipment configured to guide the seismic acquisition device to an acquisition position at the seabed, wherein the guiding equipment comprises,
a reception unit configured to receive acoustic signals from a plurality of sources, the reception unit also being configured to generate command signals in response to the received acoustic signals; and
an autonomous guiding unit configured to receive the acoustic signals from the reception unit and to control a trajectory of the seismic acquisition unit to the acquisition position on the seabed according to the received signals, wherein said control of the trajectory is performed in the seismic acquisition unit independent of input from a mother vessel,
wherein the seismic acquisition device brings back to the surface the seismic sensor when instructed.

16. The unit of claim 15, further comprising:
a memory configured to store three-dimensional coordinates of the plurality of sources.

17. The unit of claim 16, wherein the memory is further configured to store individual frequencies, modulation, and recurrence characteristics of the plurality of sources.

18. The unit of claim 17, wherein the memory is configured to further store geographical coordinates of the acquisition position.

19. The unit of claim 15, wherein the guiding equipment is configured to:
determine propagation delays based on known arrival times of the acoustic signals from the plurality of sources; and
determine a slant range based on known average velocity of the seismic acquisition unit.

20. The unit of claim 19, wherein the guiding equipment is configured to:
transform the slant range into a horizontal plane based on an immersion depth of the seismic acquisition unit;
calculate instantaneous geographical coordinates of the seismic acquisition unit in the horizontal plane;
evaluate, based on the instantaneous geographical coordinates, a deviation of the seismic acquisition unit from an optimal trajectory; and
control actuators of the seismic acquisition unit to modify its trajectory based on the determined deviation but not use a propulsion system to arrive at the acquisition position on the seabed.

* * * * *